2,919,195

ENRICHED FRUIT JUICES

Richard J. Block, Scarsdale, N.Y., assignor to Minute Maid Corporation, a corporation of Florida No Drawing. Application November 19, 1956
Serial No. 622,802

7 Claims. (Cl. 99—105)

This invention relates to an acidic fruit juice enriched with protein.

The invention is particularly useful in making from orange juice an edible liquid food containing a high proportion of dispersed milk protein and will, therefore, be first illustrated by description in connection with such use.

The desirablity of a food containing orange juice enriched with proteins of high biological value such as those of milk is recognized. Heretofore, there has been no satisfactory manner, however, of dispersing the casein of milk in the citrus juices, which, at desirable taste levels, are of pH close to the isoelectric point at which casein precipitates.

My invention provides means of so compounding milk protein and orange juice as to give a stable, edible suspension of good taste that may be frozen and, after thawing, may be kept a day or so without objectionable separation of the casein from the composition.

Briefly stated, my invention comprises the herein described method and product resulting from dispersing casein and suitable other milk components in an aqueous medium, admixing egg yolk in the dispersion so as to associate the egg yolk proteins, cholesterol, and lipid fraction with the surfaces of the particles of casein, mixing the thus stabilized casein dispersion with orange or other acidic fruit juice, and adding an acid in amount, if any, required to restore approximately the original pH of the juice.

Examples of the acidic juices that I use are those of orange, tangerine, lemon, lime, grapefruit, pineapple, grape, apple, apricot, and like acidic juices, either separately or in admixture with each other.

As the source of casein and other milk protein, I use to advantage skim milk powder which is usually about 35% protein that is mostly casein, whey powder about 10% protein mostly lactalbumin, and lactalbumin. All of these are prepared in a usual manner. Thus I use to advantage whey and skim milk, either fluid or spray dried or film dried at a temperature not above about 60° C. These milk products are substantially fat-free.

In order that the egg yolk may dissolve in my processing and become absorbed on the casein, so as to coat particles of the latter, the egg yolk must be non-heat-denatured, as shown by water solubility of the egg yolk proteins. The frozen egg yolk (about 25% solids) now available commercially is satisfactory. Undenatured egg yolk powder also is useable.

I may and suitably do introduce a substantial amount of glycine, not only for its food value but also for its action in my composition in peptizing and thus promoting the dispersion of the proteins, so as to increase the intimacy of their contact with the egg yolk during the blending operations.

I use also to advantage vitamins, minerals, and other additives that are desirable as supplements to citrus juice and milk compositions. Examples of such additives that I use are vitamin A, niacin, riboflavin, thiamine, iron citrate as a mineralizing agent, and creatine as a reliever of muscle fatigue.

The miscellaneous additives are introduced in any commercial form that is soluble or permanently suspendable in water. Thus I use an aqueous solution of vitamin A solubilized with a minor proportion of polyethyleneoxide derivative of sorbitan monooleate (Tween 80). The other additives listed are introduced to advantage in powder form.

Lactalbumin is a desirable admixture. In place of it, I may use egg albumen, or mixtures therof with lactalbumin, the total proportion being as shown for lactalbumin.

Soy protein (glycinin) may be substituted on an equal weight basis for all or part of the casein. Both these proteins are normally insoluble at pH 4.5 but are protected from precipitation in my composition at such pH by the egg yolk materials.

As to proportions, it is essential that the egg yolk on the hydrous basis (50% solids) be in proportion of at least 0.3 part for 1 part of the milk products on the dry basis. I find particularly good results in stabilizing the dispersion of casein in the final mixture with acidic juice when the proportion of the egg yolk is 1 part for 1 of the milk products on the solids basis. The proportion of egg yolk should not be so large as to disturb the flavor of the juice, that is, not much above the 1:1 proportion stated.

The proportions of the milk products, whey, skim milk, and lactalbumin are ordinarily about equal in weight on the dry basis. The proportions to each other may be varied, however, the essential point being the total proportion of casein or similar protein such as soy glycinin to the egg yolk.

The glycine is used in the proportion of 5–25 parts for 500 of the final enriched juice or about 8–40 parts for 100 of total solids in the juice.

The proportion of creatine is about 0.5–5 parts for 500 parts of the final enriched juice.

Proportions that have been found particularly satisfactory in making a product having the citrus taste, the desired balance between protein and non-protein materials, and non-separation of casein are shown in the following table. In this table and elsewhere herein all proportions are expressed as parts by weight and on the dry basis except where indicated as in the case of the fruit juice. The amount of juice is stated as the unconcentrated material after the admixture of additives including my various milk products, egg yolk, and other adidtives, unless specifically recited to the contrary.

| Component: | Amount for 500 ml. unconcentrated orange juice + additives |
|---|---|
| Whey, spray dried | g___ 10 |
| Glycine | g__ 10 |
| Egg yolk, frozen | g__ 20 |
| Lactalbumin | g__ 10 |
| Skim milk, spray dried (about 30% casein) | g__ 10 |
| Vitamin A | units__ 1500 |
| Niacin | mg__ 6 |
| Riboflavin | mg__ 0.4 |
| Thiamine | mg__ 0.3 |
| Ferric citrate | mg__ 25 |
| Creatine | g__ 4 |

The proportions in the second column of this table are calculated on the basis of a solids content of the orange juice of 11.6%, which is approximately a fourth of that of the commercial concentrated, frozen orange juice of density 41°–42° Brix.

In compounding my enriched citrus juices, I mix the first five components of the table above with 300 g. water in about the order in which they are given. If the milk products are in undried fluid form, the water is omitted or reduced in amount. The mixture is then passed through a conventional milk homogenizer which makes either a solution or a fine dispersion of the solid materials in the water. The whole is then pasteurized and spray dried or film dried in vacuo at a temperature below that of denaturing of the egg yolk protein as not above about 60° C. and ordinarily about 50° C.

This homogenizing of the mixture causes the proteins, cholesterol, and lipids of the egg yolk to become intimately associated with the casein present and, when the whole is later brought to approximately the isoelectric point of casein, to collect in large proportion over the surfaces of the minute particles of casein, so as to avoid agglomeration of the casein into larger particles that if formed would settle rapidly.

The various minor additives such as vitamins, minerals, creatine, and the like, are incorporated to advantage before the homogenizing step. They may be introduced later somewhat less satisfactorily or they may be omitted entirely if their effects on the final composition are not desired.

The final step is mixing of the additive composition either dried or liquid with the fruit juice, suitably a concentrated material ready for freezing.

Mixing with the orange juice is made thorough as by passage through any standard homogenizer such as a milk homogenizer, water being added as required to the material fed to the homogenizer so as to maintain the fluidity and produce a homogenized mixture of the desired consistency and solids content. The product is then ready for freezing and distribution as a protein fortified juice.

I find that my dried additive mixture when introduced into orange juice as described does not settle in spite of the pH of the juice that would be expected to cause precipitation of casein and result in a gritty taste.

The invention will be further illustrated by description in connection with the following specific examples of the practice of it.

*Example 1*

Into 5000 grams (g.) of water there are introduced in turn 100 g. of glycine USP, 200 g. of frozen egg yolk substantially free from white of egg, 100 g. of lactalbumin and 100 g. of dry skim milk powder.

There are then introduced 15,000 units of solubilized vitamin A, 60 mg. of niacin, 4 of riboflavin, 3 of thiamine hydrochloride and 244 of iron citrate.

The whole is homogenized by passage through a milk homogenizer, pasteurized, and dried in the form of a film on a heated surface in vacuo at a temperature of 50° C. or by spray drying.

If dried, the material is then milled to a fine powder and dispersed in concentrated orange juice of suitable density in amount to make the total volume 2,500 ml.

There is introduced a non-toxic edible acid, if any is required, to restore the taste and acidity of the juice to approximately its original level. In the case of orange juice, the pH so established is about 3.8–4.2. Examples of acids that are used are citric, tartaric, lactic, hydrochloric, phosphoric, and sulfuric acids. The material is again passed through the homogenizer, then quickly frozen at about −30° to −40° C., and stored frozen for subsequent distribution.

The product so made, when thawed and diluted with 1 times its volume of water, is sufficiently stable as to stand 24 hours or longer without appreciable coagulation of the milk protein present or separation from the diluted juice. It has a good flavor, a high energy value, and sufficient proteins to constitute a balanced food product.

If desired, the entire moisture of fruit juice and additives may be dried in any usual manner and distributed in dry form in packages that prevent the entrance of moisture such as are used for the packaging of dried skim milk.

*Example 2*

The procedure of Example 1 is followed except that the milk products and water there used are replaced by (1) whey representing the filtrate from the separation of casein in the acid process, (2) fluid skim milk, and (3) the wet filter press cakes of lactalbumin precipitated by heat coagulation in skim milk. These products (1), (2), and (3) are used in proportions to give the dry weight of whey solids, skim milk powder, and lactalbumin, respectively, as recited in Example 1.

*Example 3*

The procedure of Example 1 or 2 is followed with the exception of the addition of any one of the non-toxic edible acids listed herein to the aqueous mixture of the various additives before the said spray drying step. The acid is introduced in proportion to establish the pH within the range 3.5–4.5.

*Example 4*

The procedure of Example 1, 2, or 3 is followed except that any of the other fruit juices listed herein is substituted for the orange juice. The said other juice is introduced in proportion by volume equal to the orange juice corrected by a factor corresponding to the different degrees of concentration, if any, of the two juices as supplied. Thus the substitution of a non-concentrated orange juice requires approximately 2–4 volumes of the non-concentrated juice to replace 1 volume of the concentrated orange juice.

*Example 5*

The procedure of Example 1 is followed except that the 100 parts of whey powder is replaced by a compound or mixture of compounds that are non-toxic and edible, in amount providing 0.7 part of calcium (Ca). Examples of such compounds that I use are calcium phosphate $Ca(H_2PO_4)_2$, chloride, lactate, and citrate.

*Example 6*

The procedure of Example 1 is followed except that the freezing step is omitted and is replaced by drying the final mixture of additives with the orange juice. The drying is effected by spray drying or by lyophilization in any standard manner, the temperature of the material undergoing drying being maintained at all times below about 60° C.

The product is a solid mixture of the juice solids and additives. When dispersed in water, at the time of use, the egg yolk solids show their protection of the casein from precipitation by the acidity of juice.

*Example 7*

The procedure of any of the Examples 1–6 is followed except that the skim milk powder is replaced by soy glycinin in amount equal to the casein content of the skim milk powder.

*Example 8*

The procedure of any of the Examples 1–7 is followed except that lactalbumin (added as such or as a skim milk component) is replaced by an equal weight on the dry basis of egg white or egg albumen.

It is to be understood that it is intended to cover all changes and modifications of the examples of the invention herein chosen for the purpose of illustration which do not constitute departures from the spirit and scope of the invention.

I claim:

1. A protein-enriched acidic fruit juice consisting essentially of a dispersion in fruit juice of a blend of a water-dispersible naturally-occurring protein selected from the group consisting of casein, milk protein, and soy protein, and water-soluble naturally-occurring nondenatured egg yolk, the dispersion having a pH within the range from about 3.5 to about 4.5, at which pH the protein would normally precipitate, and the egg yolk being in an amount within the range from 0.3 to about 1 part per part of protein to prevent precipitation of the protein at such pH.

2. A protein-enriched acidic fruit juice concentrate consisting essentially of a dispersion in concentrated fruit juice of a blend of a water-dispersible naturally-occurring protein selected from the group consisting of casein, milk protein and soy protein, and water-soluble naturally-occurring nondenatured egg yolk, the dispersion having a pH within the range from about 3.5 to about 4.5 at which pH the protein would normally precipitate, and the egg yolk being in an amount within the range from 0.3 to about 1 part per part of protein to prevent precipitation of the protein at such pH.

3. A protein-enriched acidic orange juice consisting essentially of a dispersion in orange juice of a blend of a water-dispersible naturally-occurring protein selected from the group consisting of casein, milk protein and soy protein, and water-soluble naturally-occurring nondenatured egg yolk, the dispersion having a pH within the range from about 3.8 to about 4.2 at which pH the protein would normally precipitate, and the egg yolk being in an amount within the range from 0.3 to about 1 part per part of the protein to prevent precipitation of the protein at such pH.

4. A protein-enriched acidic fruit juice consisting essentially of a dispersion in fruit juice of a blend of a water-dispersible naturally-occurring protein selected from the group consisting of casein, milk protein and soy protein, and water-soluble naturally-occurring nondenatured egg yolk, the dispersion having a pH within the range from about 3.5 to about 4.5 at which pH the protein would normally precipitate, the egg yolk being in an amount within the range from 0.3 to about 1 part per part of protein to prevent precipitation of the protein at such pH, glycine in an amount within the range from 5 to 25 parts per 500 parts of juice, creatine in an amount within the range from 0.5 to 5 parts per 500 parts of fruit juice, and added vitamins.

5. A protein-enriched acidic fruit juice in accordance with claim 1 in which the protein comprises skim milk protein and lactalbumin.

6. A protein-enriched acidic fruit juice in accordance with claim 1, in which the protein comprises skim milk protein, whey protein, and lactalbumin.

7. A process for preparing a protein-enriched acidic fruit juice which comprises homogenizing an aqueous dispersion of a water-dispersible naturally-occurring protein selected from the group consisting of casein, milk protein and soy protein and water-soluble naturally-occurring nondenatured egg yolk in an amount within the range from 0.3 to about 1 part per part of the protein, drying the homogenized mixture at a temperature below that of heat denaturation of the egg yolk, mixing the resulting blend with an acidic fruit juice, homogenizing the resulting dispersion, and adding thereto, if necessary, an edible nontoxic acid in an amount to establish the pH within the range from about 3.5 to about 4.5.

References Cited in the file of this patent

UNITED STATES PATENTS

| | | |
|---|---|---|
| 1,226,983 | Monti | May 22, 1917 |
| 1,646,228 | Zoller | Oct. 18, 1927 |
| 1,767,185 | Nielsen | June 24, 1930 |
| 1,925,441 | Finley et al. | Sept. 5, 1933 |
| 1,941,243 | Bergsvik | Dec. 26, 1933 |
| 1,941,261 | Hellerud | Dec. 26, 1933 |
| 2,055,782 | Baier | Sept. 29, 1936 |

OTHER REFERENCES

Fieser et al.: Organic Chemistry, 1944, p. 430.